United States Patent

[11] 3,599,811

| [72] | Inventor | Wilson F. Watkins<br>7263 Oakdale Ave., Canoga Park, Calif.<br>91306 |
|---|---|---|
| [21] | Appl. No. | 836,745 |
| [22] | Filed | June 26, 1969 |
| [45] | Patented | Aug. 17, 1971 |

[54] VEHICLE-TOWING APPARATUS
5 Claims, 9 Drawing Figs.

[52] U.S. Cl. ............................................ 214/86 A, 214/334
[51] Int. Cl. ............................................ B60p 3/12
[50] Field of Search ............................................ 214/86 A, 84, 85, 330, 334

[56] References Cited
UNITED STATES PATENTS
| 2,197,406 | 4/1940 | Fleming et al. ............ | 214/86 A |
| 2,449,146 | 9/1948 | Ryan ............ | 214/86 A |
| 2,793,770 | 5/1957 | Denis ............ | 214/86 A |
| 3,434,607 | 3/1969 | Nelson ............ | 214/86 A |
| 3,434,608 | 3/1969 | Nelson ............ | 214/86 A |

FOREIGN PATENTS
| 845,105 | 8/1960 | Great Britain ............ | 214/330 |

*Primary Examiner*—Albert J. Makay
*Attorney*—Spensley, Horn and Lubitz

ABSTRACT: A vehicle-towing apparatus which is particularly suitable for towing an automobile, is disclosed. The apparatus engages the rear wheels of the automobile and lifts them above the ground when the automobile is towed. No cabling or hooks are coupled to the automobile when it is being towed. The apparatus is adaptable for towing a vehicle without entering the vehicle and thus may be used for towing locked vehicles.

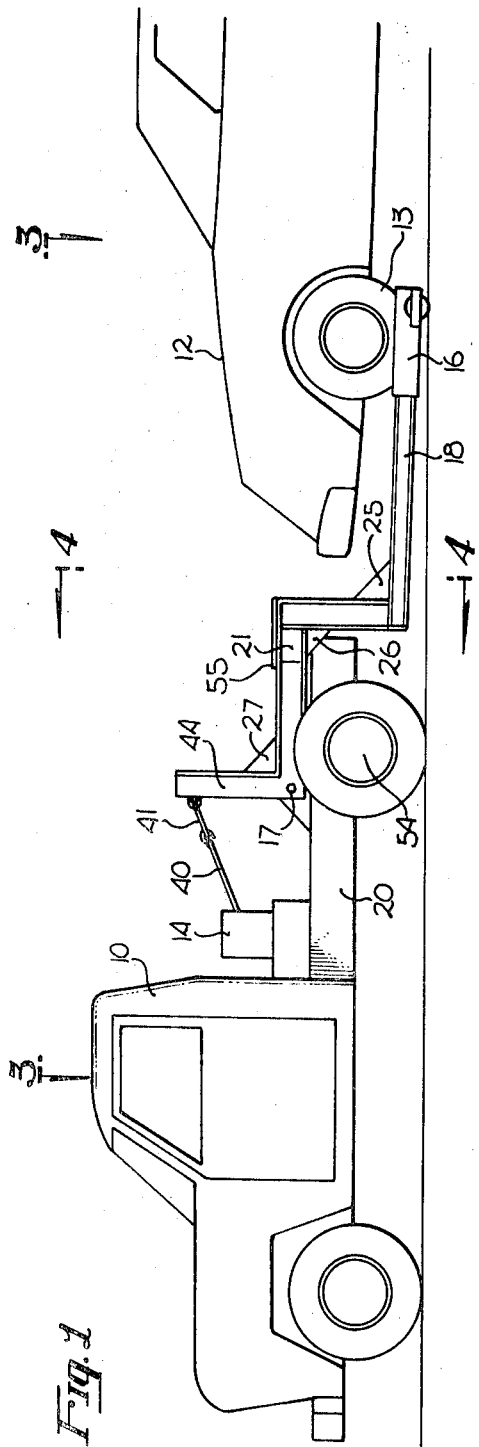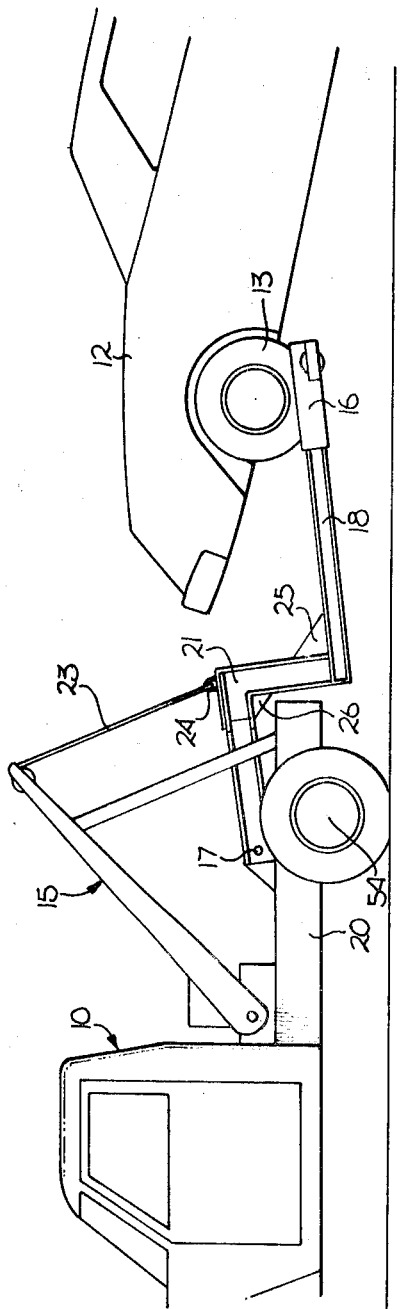

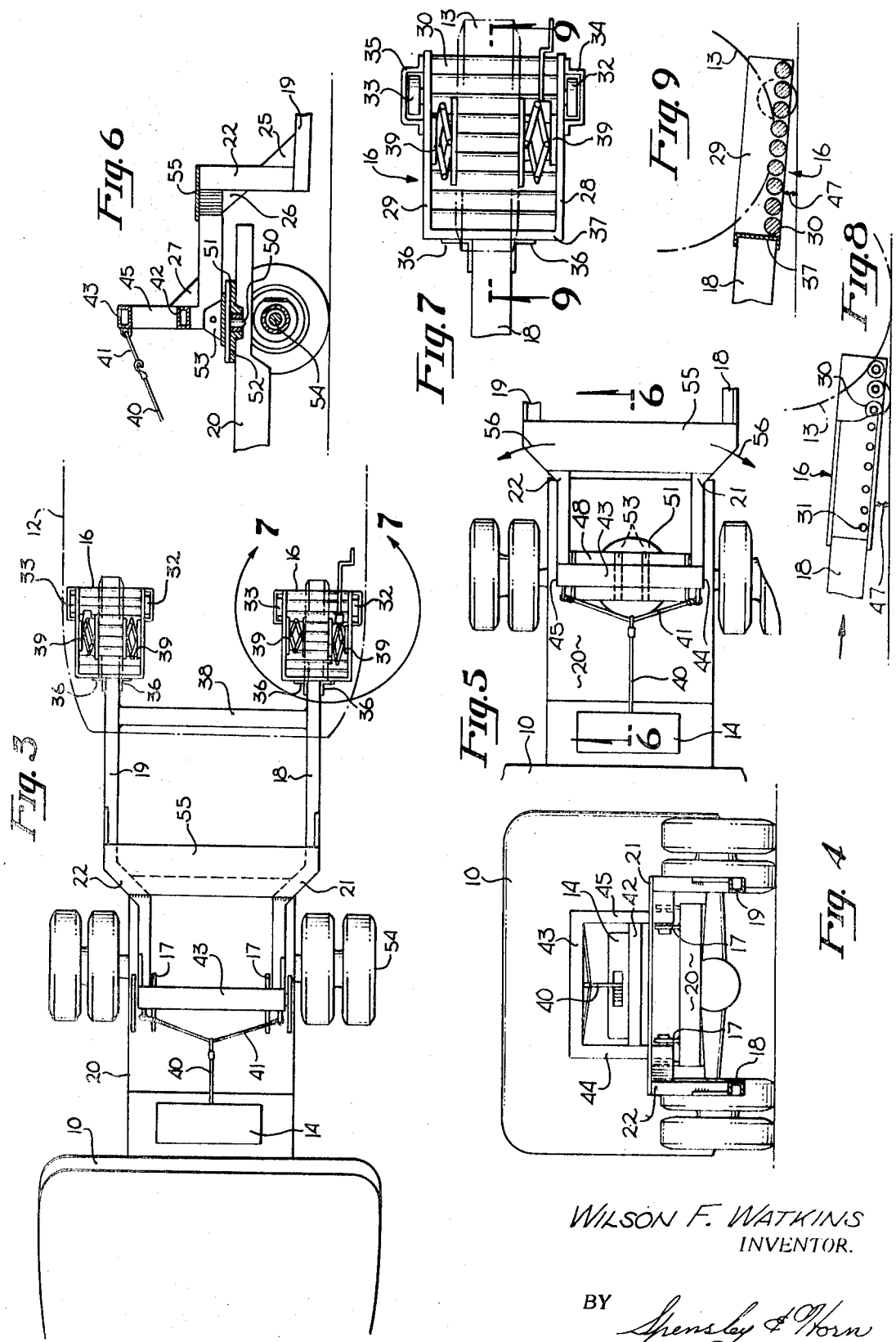

VEHICLE-TOWING APPARATUS

BACKGROUND OF THE INVENTION

1. Field of the Invention

The invention relates to means for towing vehicles.

2. Prior Art

Numerous devices are available for towing vehicles such as automobiles. Typically, these devices have hooks or cables for lifting one end of the vehicle off the ground so that the vehicle may be towed. Such devices have numerous disadvantages. FOr example, the cable or hook which is coupled to the vehicle may damage the bumper or frame of the vehicle. In cases where the front end of the vehicle is lifted, access to the inside of the vehicle is necessary to release the emergency brake and to place the transmission in neutral, thus making it difficult to tow a locked vehicle.

It is necessary in some towing applications tow a vehicle when the vehicle is locked. Such applications include the repossession of automobiles by lenders and the removal of parked vehicles from prohibited parking zones. In all towing applications, it is desirable to tow a vehicle without damaging the vehicles. The cables and hooks commonly used in towing apparatuses inevitably cause damage to the bumper or framework of the automobile.

SUMMARY OF THE INVENTION

An apparatus suitable for towing a vehicle such as an automobile is described. The apparatus engages the rear wheels of the vehicle and lifts them above the ground when the vehicle is being towed. A pair of arms are pivotally coupled at one end to a mobile platform such as a truck. A ramp containing a plurality of rollers is coupled to the other end of each of the arms. The ramps are adaptable for being rolled beneath the wheels of an automobile. Once the ramps have engaged the wheels of an automobile, gripping means are provided to secure the wheel on the ramp. Hoisting means such as a winch or crane, rotate the arms about their pivotal points thereby lifting the wheels of the vehicle off the ground. Once the wheels of the vehicle are lifted above the ground, the vehicle is towed by the truck.

BRIEF DESCRIPTION OF THE DRAWINGS

FIG. 1 illustrates the towing apparatus engaging the rear wheels of an automobile wherein the hoisting means utilized by the apparatus is a winch;

FIG. 2 illustrates an automobile engaging the towing apparatus where the rear wheels of the automobile have been lifted above the ground and the hoisting means utilized by the apparatus is a crane;

FIG. 3 is the plan view of the apparatus and vehicle shown in FIG. 1 taken along section line 3–3 of FIG. 1;

FIG. 4 is a rear view of a towing apparatus shown in FIG. 1 taken along section line 4–4 of FIG. 1;

FIG. 5 illustrates an alternate embodiment of the present invention wherein the arms of the apparatus are adaptable for movement in a horizontal plan when the vehicle is being towed;

FIG. 6 is a sectional view of the apparatus shown in FIG. 5 taken along section line 6–6 of FIG. 5;

FIG. 7 is an enlarged view of the ramp means contained within section line 7–7 of FIG. 3;

FIG. 8 is a side view of the ramp means as it begins to engage the wheel of a vehicle; and FIG. 9 is a side view of the ramp means engaging a wheel taken along section line 9–9 of FIG. 7.

DETAILED DESCRIPTION OF THE INVENTION

Referring to FIGS. 1, 3 and 4, the various components which comprise the vehicle-towing apparatus are readily seen. The apparatus comprises: a pair of arms 18 and 19 which are pivotally coupled at one end to truck 10; ramp means 16 which are coupled to each of the other ends of arms 18 and 19; gripping means comprising scissor jacks 39 which are connected to each of the ramp means 16; and a hoisting means comprising winch 14 and cable 40 which is coupled to beam 43 such that the hoisting means is adaptable to rotate arms 18 and 19 about hinges 17 thereby lifting ramp means 16 above the ground.

Arms 18 and 19 are elongated metal members which extend rearwardly from truck 10. Arms 18 and 19 are coupled to hinges 17 by means of L-shaped members 21 and 22, respectively. Arm 18 is rigidly coupled to L-shaped member 21 at approximately a right angle to member 21. Likewise, arm 19 is rigidly coupled to L-shaped member 22. The interconnection between the arms 18 and 19 and the L-shaped members 21 and 22 is reinforced by means of gussets 25. The distance between arms 18 and 19 is approximately equal to the distance between the tires on an automobile or other vehicle to be towed. Since the width of platform 20 of truck 10 is typically less than the distance between arms 18 and 19, L-shaped members 21 and 22 will each be irregularly shaped to allow interconnection between arms 18 and 19 and hinges 17 as is shown in FIG. 3. Crossbeam 38 which is disposed between arms 18 and 19 is a metal member which provides cross support between the arms. A cross support 55 is disposed between L-shaped members 21 and 22 and provides support between these members. Each of the L-shaped members 21 and 22 is supported at its corner by means of gussets 26. Arms 18 and 19, L-shaped members 21 and 22, crossbeam 38, cross support 55 and gussets 25 and 26 may be ordinary steel members fabricated utilizing commonly known techniques.

Truck 10 which provides the towing force for towing vehicle 12 may be an ordinary pickup truck having a platform 20. Hinges 17, ordinary metal hinges, are rigidly coupled to platform 20. It has been found that the disclosed apparatus performs more satisfactorily if the hinges 17 are coupled to platform 20 forward of rear axle 54 of truck 10.

A hoisting frame comprising horizontal beam supports 44 and 45, crossbeam 42, and horizontal beam 43 is utilized to couple the L-shaped members 21 and 22 with winch 14. Beam support 44 is rigidly coupled to L-shaped member 21 at approximately a right angle to member 21 at a hinge 17. Support 45 is likewise coupled to L-shaped member 22 at a hinge 17. A crossbeam 42 is disposed between supports 44 and 45, and provides cross support between supports 44 and 45. A beam 43 is disposed horizontally between supports 44 and 45. Members 42, 43, 44 and 45 may be ordinary steel members fabricated utilizing commonly known techniques. A cable 41 is disposed between the opposite end of beam 43. A winch 14 which is rigidly coupled to perform 20 is connected to cable 41 by means of cable 40. The winch 14 is adaptable for pulling cable 40, thereby causing the L-shaped members 21 and 22 and arms 18 and 19 to rotate about hinge 17 to the position shown in FIG. 2.

While a winch 14 is illustrated in FIGS. 1, 3, 4, 5 and 6 as a hoisting means for causing arms 18 and 19 to be lifted above the ground, numerous other hoisting means may be utilized within the scope of the present invention. For example, in FIG. 2, a crane 15 is utilized to hoist the arms 18 and 19 above the ground. An eyebolt 24 which is rigidly coupled to cross support 55 is coupled to crane 15 by means of cable 23. Other hoisting means such as hydraulic means may also be used within the scope of the present invention. For example, a hydraulic cylinder and piston may be placed between platform 20 and the horizontal section of L-shaped members 21 and 22. A hydraulic means actuated in this position would provide a lifting force which would rotate arms 18 and 19 in the same manner as winch 14 of FIG. 1 or crane 15 of FIG. 2.

A ramp means 16 is rigidly coupled to each of the arms 18 and 19 at the ends of the arms opposite their pivotal coupling with hinges 17. Referring to FIG. 7, the ramp comprises a U-shaped frame consisting of elongated side supports 28 and 29 and a front support member 37. Member 37 is rigidly coupled to arm 18 and supported by the L-shaped braces 36. A plurality of rollers 30 are disposed between side supports 28 and 29 approximately parallel to front support member 37. The rollers 30 are coupled to the side support members 28 and 29 by means of bearings such as ball bearings. Each roller is able to freely turn independently. The rollers 30 are coupled to the side supports 28 and 29 such that a straight line passing through the centers of the rollers form an acute angle 47 (FIG. 8) with the ground. Angle 47 should preferably be less than 10°.

U-shaped frames 34 and 35 are rigidly coupled to side supports 28 and 29, respectively, at the ends of the supports, opposite their connection with front support 37. Hard rubber ramp wheels 32 and 33 are coupled between frame 34 and side supports 28, and frame 35 and side supports 29, respectively. Ramp wheels 32 and 33 are adaptable for supporting ramp means 16 such that when the ramp wheel 32 or 33 engages the ground, the plurality of rollers 30 are held above the ground. Ramp means 16 including the side supports 28 and 29, the front support 37, braces 34, 35 and 36, and rollers 30 may be ordinary metal parts manufactured utilizing commonly known techniques.

Gripping means are provided within ramp means 16 such that when a wheel engages the ramp means, it may be rigidly held within the ramp means 16. In FIG. 7, scissor jacks 39 are shown rigidly coupled to side supports 28 and 29. Once a wheel has engaged ramps means 16, such as wheel 13, the jacks 39 are tightened against the wheel thereby securing the wheel on the ramp means. Other gripping means, such as hydraulic jacks, may be utilized in place of scissor jacks 39. Scissor jacks 39 may be ordinary metal scissor jacks commonly utilized for lifting automobiles.

Referring to FIGS. 8 and 9, the method in which ramp means 16 engages wheel 13 is illustrated. In FIG. 8, the first roller 30 is shown engaging wheel 13 of vehicle 12 (FIG. 1). Note, the ramp wheels 32 and 33 of FIG. 7 support the ramp allowing the rollers 30 to turn freely when they engage wheel 13. Even after wheel 13 has engaged and is supported by ramp means 16, the ramp wheels support ramp 16. The ramp means 16 is driven beneath wheel 13. The wheel is lifted off the ground as it engages the rollers 30 because ramp means 16 forms an incline with the ground defined by acute angle 47. Thus, the ramp action of means 16 forces wheels 13 to engage the rollers 30.

In FIGS. 5 and 6, an alternate embodiment of the present invention is illustrated in that an alternate coupling means between L-shaped members 21 and 22 and platform 20 of truck 10 is illustrated. The L-shaped members 21 and 22, arms 18 and 19, and the hoisting frame are similar to those previously discussed in conjunction with FIGS. 1, 3 and 4. A crossmember 48 is disposed between the L-shaped members 21 and 22 at the point at which these members join the horizontal beams supports 44 and 45. Member 48 is hingingly coupled to hinge plate 51, a circular plate, by means of hinges 53. Hinge 53 may be similar to hinges 17 discussed in conjunction with FIGS. 1, 3 and 4. The surface of hinge plate 51 opposite hinges 53 contains a cylindrical stud 50 axially mounted to circular plate 51. A bearing plate 52 which is rigidly coupled to platform 20 is adaptable for rotatably engaging plate 51 and stud 50. Thus, in the embodiment of the present invention shown in FIGS. 5 and 6, arms 18 and 19 are able to freely turn in a horizontal plane about stud 50 as indicated by arrows 56 in FIG. 5.

Referring to FIG. 1, the method in which the present invention is utilized may be readily understood. FIrst, the ramp means 16 are driven beneath the rear wheels 13 of vehicle 12 by backing truck 10 towards vehicle 12. Note, the front wheels of the vehicle may also be utilized but the rear wheels of the vehicle are preferably utilized for an automobile which has a front mounted engine. Blocks may be placed in front of the front wheels of the vehicle so that the vehicle does not roll when the ramp means are driven beneath the rear wheels 13. As previously explained, in conjunction with FIGS. 8 or 9, the ramp means readily engages wheel 13 because of the plurality of rollers 30 which freely turn beneath the wheel 13. Note that it does not matter if the emergency brake of vehicle 12 is engaged since ramp means 16 will engage wheel 13 even where the wheel cannot be rotated. Once the ramp 16 has driven beneath wheel 13 and the wheel is supported by the ramp, the wheel is then securely held on the ramp by the gripping means comprising scissor jacks 39. The scissor jacks are adjusted until they abut and grip wheel 13. In some cases one scissor jack 39 will be extended more than the other since the distance between the wheels 13 of some vehicles will be different than the distance between the ramps. The width of the ramp means 16 may be made wide enough to accommodate numerous vehicles.

Once the rear wheels 13 have been secured on the ramp means, the arms 18 and 19 are rotated about hinge 17 by means of the hoisting means comprising either the winch 14 of FIG. 1 or the crane 15 of FIG. 2. In FIG. 2, the vehicle 12 is shown with the ramp means and the rear of vehicle 12 raised above the ground. In this position, the vehicle may be readily towed.

The use of the embodiment described in FIGS. 5 and 6 is the same as previously discussed. THe embodiment disclosed in FIGS. 5 and 6 allows the vehicle to have movement in the direction indicated by arrows 56 when it is being towed. This is particularly helpful for larger automobiles.

Thus, a vehicle-towing apparatus has been disclosed which is particularly suitable for towing automobiles. Access to the inside of the automobiles is not required in order to tow the vehicle. In addition, no cables or hooks are coupled to the automobile when it is being towed.

I claim:

1. A vehicle-towing apparatus for use on the platform of a truck comprising:
   an arm;
   a pivotal coupling means for pivotally coupling one end of said arm to said platform;
   a ramp means for engaging and supporting a wheel of a vehicle coupled to said other end of said arm comprising a plurality of rollers for rolling under the wheel of a vehicle and ramp wheels coupled to said ramp means such that said rollers are held above the ground when said ramp wheels engage the ground;
   gripping means for holding a wheel on said ramp means comprising a pair of scissor jacks each coupled to an opposite side of said ramp means; and,
   hoisting means coupled between said arm and platform, for hoisting said arm about said pivoted coupling such that said other end of said arm is raised above the ground thereby allowing a vehicle whose wheel is engaging said ramp means to be towed.

2. The apparatus defined in claim 1 wherein said hoisting means comprises a winch.

3. The apparatus defined in claim 1 wherein said hoisting means comprises a crane.

4. The apparatus defined in claim 1 wherein said hoisting means comprises hydraulic means.

5. The apparatus defined in claim 1 wherein said pivotal coupling means is a hinge.